United States Patent [19]

Woods et al.

[11] 4,042,860

[45] Aug. 16, 1977

[54] COMBINATION STARTER-PROTECTOR DEVICE

[75] Inventors: Lee O. Woods, Morrison; James P. Frank, Rock Falls, both of Ill.

[73] Assignee: General Electric Company, Fort Wayne, Ind.

[21] Appl. No.: 624,381

[22] Filed: Oct. 21, 1975

[51] Int. Cl.[2] .......... H02H 7/085

[52] U.S. Cl. .......... 361/25 C; 310/68 C; 318/221 H; 318/473

[58] Field of Search .......... 317/13 C, 13 A, 13 B, 317/13 R, 41; 318/221 H, 221 C, 221 B, 221 A, 471, 472, 473; 310/68 R, 68 C; 337/100, 102, 107; 338/22 SD, 220, 13

[56] References Cited

U.S. PATENT DOCUMENTS

| | | | |
|---|---|---|---|
| 2,338,515 | 1/1944 | Johns | 317/13 |
| 2,667,612 | 1/1954 | Lucas | 318/221 H |
| 2,768,342 | 10/1956 | Vaughan et al. | 318/221 A |
| 2,771,528 | 11/1956 | Moran | 200/122 |
| 2,786,171 | 3/1957 | Clark | 318/221 A |
| 3,168,661 | 2/1965 | Rini | 310/68 C |
| 3,434,089 | 3/1969 | Waseleski, Jr. et al. | 337/107 X |
| 3,521,138 | 7/1970 | Enemark et al. | 318/221 |
| 3,549,970 | 12/1970 | Lewus | 317/13 |
| 3,695,054 | 10/1972 | Barry | 318/221 H X |
| 3,737,752 | 6/1973 | Strachan | 318/471 |
| 3,840,834 | 10/1974 | Obenhaus et al. | 337/107 |
| 3,879,685 | 4/1975 | Epstein et al. | 318/221 H |
| 3,913,342 | 10/1975 | Barry | 318/473 X |
| 3,921,117 | 11/1975 | Blaha | 318/471 X |
| 3,924,222 | 12/1975 | Slocum | 318/471 X |
| 3,925,748 | 12/1975 | Slocum | 310/68 C |
| 3,955,170 | 5/1976 | Geishecker | 318/471 X |

*Primary Examiner*—J D Miller
*Assistant Examiner*—Patrick R. Salce
*Attorney, Agent, or Firm*—Joseph E. Papin

[57] ABSTRACT

A combination starter-protector device for a winding circuit of a dynamoelectric machine. The device has a housing with at least one terminal therein adapted for connection with a power source, and means is provided in the housing for controlling starting of the dynamoelectric machine. Means is mounted to the housing for electrical contact and positioning engagement with the starting controlling means and adapted for connection in circuit relation with the winding circuit. Another circuit is provided between the engagement means and the at least one terminal for supplying power to the winding circuit when the engagement means is connected in circuit relation therewith, and the other circuit includes means in the housing and operable generally in response to a certain thermal condition occasioned upon winding circuit overload for interrupting the other circuit.

Other combination starter-protector devices are also disclosed.

43 Claims, 15 Drawing Figures

COMBINATION STARTER-PROTECTOR DEVICE

CROSS-REFERENCE TO RELATED APPLICATION

This application is related to U.S. patent application Ser. No. 508,457 filed Sept. 3, 1974 by Donald H. Stoll which is incorporated herein by reference.

BACKGROUND OF THE INVENTION

This invention relates generally to dynamoelectric machines and in particular to a combination starter-protector device therefor.

In the past, various protector devices have been employed for taking a winding circuit of a dynamoelectric machine off the line in the event of the occurrence of a winding circuit overload condition which, of course, may have deleterious affects on components of such dynamoelectric machine, such as for instance burning-out the winding circuit. One such protector device is disclosed in U.S. Pat. No. 2,771,528 issued to D. E. Moran on Nov. 20, 1956. Also in the past, various starting devices have been employed to render a start winding generally ineffective in the winding circuit of a dynamoelectric machine, such as a split phase electric motor for instance, when the dynamoelectric machine attains a certain speed. Some of these devices are well-known to the art, such as centrifugal starting switches and starting relays or the like. Positive temperature coefficient resistors have also been employed with winding circuit of a split phase motor to render the start winding ineffective generally at a certain motor speed, as shown in U.S. Pat. No. 3,737,752 and U.S. Pat. No. 3,559,016.

Of course, these past starter devices and protector devices were mounted to a dynamoelectric machine in various manners. Some were disposed on a terminal board in the dynamoelectric machine and others were laced or otherwise disposed in or adjacent to the windings of the dynamoelectric machine. Still others were mounted to the housing of the dynamoelectric machine and connected by leads to the winding circuit. As shown in U.S. Pat. No. 3,168,661, a starting relay and protector device was plugged onto a cooperating plug member mounted to an electric motor casing, and in the case of a hermatic motor for an air conditioning compressor or the like, such a plug member may be connected in circuit relation with the winding circuit of the hermetic motor and remotely located therefrom on the compressor jacket or housing.

SUMMARY OF THE INVENTION

Among the several objects of the present invention may be noted the provision of a combination starter-protector device in which the starting components and protecting components are contained in a housing and connected in a common circuit; the provision of such combination starter-protector device in which at least some of its components in such common circuit are mounted therein by current carrying circuit parts; the provision of such combination starter-protector device in which at least some of its components in such common circuit define means adapted for receiving in electrical connection a mounting plug set connected in circuit relation with a winding circuit for a dynamoelectric machine; and the provision of such combination starter-protector device which is simplistic in design, easily assembled and economically manufactured. These as well as other objects and advantageous features of the present invention will be in part apparent and in part pointed out hereinafter.

In general, a combination starter-protector device in one form of the invention is provided for a winding circuit of a dynamoelectric machine adapted to be energized from a power source. The combination starter-protector device has a housing, and is provided in the housing for controlling energization of the start winding. A pair of means are mounted in the housing for electrical contact and positioning engagement with the energization controlling means, and said engagement means include means integrally formed therewith and adapted to be connected in circuit relation with the winding circuit, respectively. Circuit means for connection with one of the engagement means and adapted to be connected in circuit relation with the power source includes means operable generally in response to a predetermined thermal condition occasioned upon winding circuit overload for interrupting the circuit means.

BRIEF DESCRIPTION OF THE DRAWINGS

Corresponding reference characters indicate corresponding parts throughout the several views of the drawings.

The exemplifications set out herein illustrate preferred embodiments of the invention in one form thereof, respectively, and such exemplifications are not to be construed as limiting in any manner the scope of the invention.

DETAILED DESCRIPTION OF THE PREFERRED EMBODIMENTS

Figure 1:
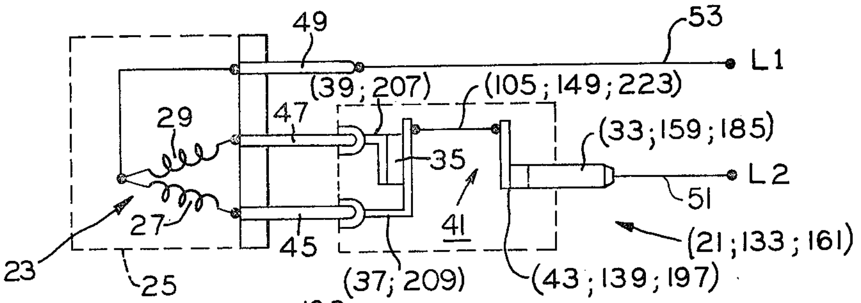
FIG. 1 is a diagıammatic view of a winding circuit for a dynamoelectric machine showing schematically therein a combination starter-protector device in one form of the invention.
Figure 2:
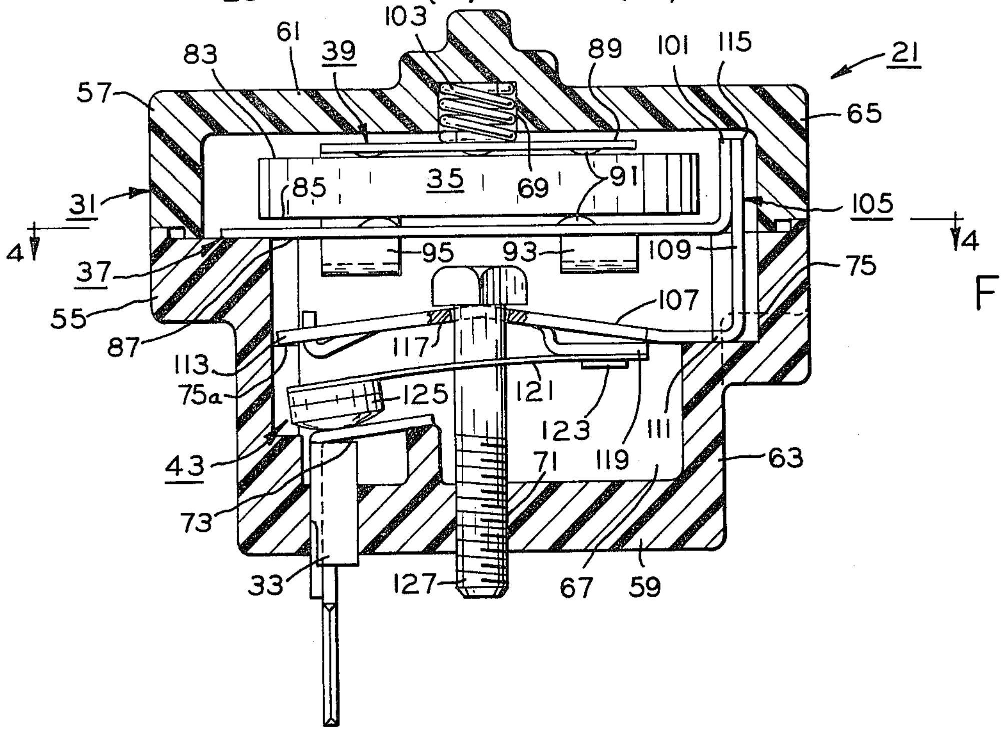
FIGS. 2 and 3 are sectional views respectively illustrating combination starter-protector devices, each in one form of the invention, in cross-section.
Figure 3:
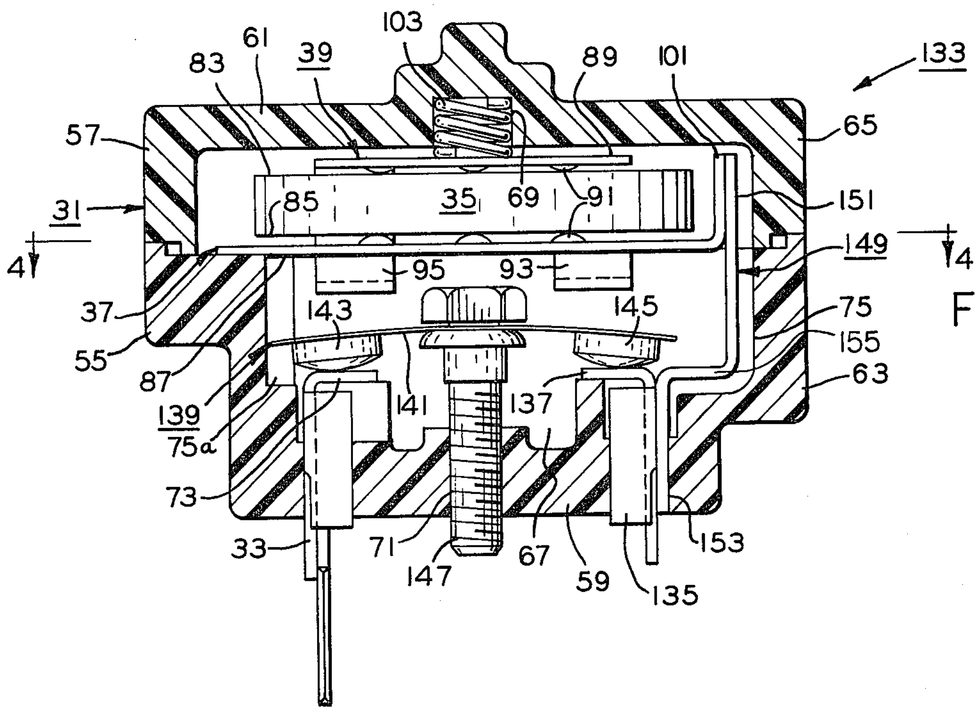
Figure 4:
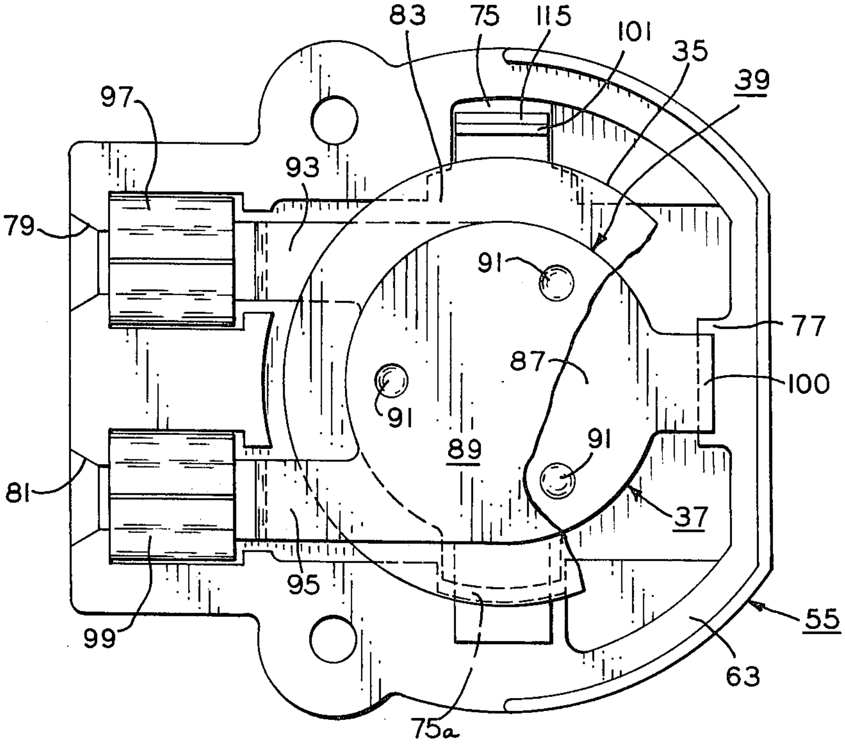
FIG. 4 is a sectional view taken generally along line 4—4 of FIGS. 2 and 3 being common thereto.

Referring now to the drawings in general, there is shown in one form of the invention a combination starter-protector device 21 for a winding circuit 23 of a dynamoelectric machine 25 having a run or main winding 27 and a start or auxiliary winding 29 adapted to be energized from a power source generally constituted across line terminals L1, L2 (FIG. 1). Device 21 has a housing 31 with at least one terminal 33 adapted to be connected with power source L1, L2, and means, such as a solid state component for instance a temperature responsive resistance member, thermistor or positive temperature coefficient resistor (hereinafter referred to as a PTCR) 35, is provided in the housing for controlling energization of start winding 29 (FIGS. 2–4). A pair of means, such as mounting plates or members 37, 39, or mounted in housing 31 for electrical contact and positioning or supporting engagement with energization controlling means or PTCR 35, and the engagement means or members 37, 39 are adapted to be connected in circuit relation with run winding 27 and start winding 29, respectively (FIG. 1). Means comprising another circuit or circuit means, indicated generally at 41, between one of the engagement means 37 and the at least one terminal 33 for supplying power therefrom to winding circuit 23 includes means, such as a winding circuit protector switch or switch means 43, in housing 31 and operable generally in response to a certain or predetermined thermal condition occasioned upon winding circuit overload for interrupting the other circuit (FIGS. 2–4).

As is well-known in the art, winding circuit or motor overload may have deleterious affects on the components of a motor, such as for instance the shorting burning-out of the motor windings or winding circuit. These overloads or overload conditions may be effected by a plurality of different causes or by combinations of such causes. For instance, some of the well-known causes of these overload conditions are: a running overload; a high temperature overload; an overload occasioned by a stalled or locked rotor; and a high current overload. Irrespective of the particular cause or combination of causes effecting such an overload condition, a deleteriously high current is drawn by the motor, and such high current is usually accompanied by or results in a high temperature condition. Therefore, for the sake of simplifying the discussion of motor overloads or overload conditions hereinafter, it is to be understood that any cause or causes for effecting such motor overload will be discussed only within the context of a high current draw or condition accompanied by a high temperature or thermal condition with respect to the motor winding circuit.

More particularly and with specific reference to FIG. 1, dynamoelectric machine 25, such as an electric motor of the split phase type, is illustrated as having an assembly or set of mounting plugs 45, 47, 49 mounted to a structural component, such as a housing or the like, of the motor by suitable means (not shown) as is well-known in the art; however, it is also contemplated that the mounting plug set may be remotely mounted with respect to the motor to another structural component, such as a jacket or housing of a compressor or the like for instance, and connected in circuit relation with winding circuit 23 of the motor disposed within the compressor housing, as also well-known to the art. A pair of leads or other electrical connections 51, 53 may be electrically connected between terminal 33 of device 21 and line terminal L2 and between mounting plug 49 and line terminal L1 so as to connect motor 25 across the power source. Device 21 is adapted for assembly onto mounting plugs 45, 47 so as to be connected in circuit relation with motor winding circuit 23.

Device 21, as shown in FIGS. 2 and 4, is provided with housing 31 formed of any suitable insulating material and comprising a casing or receptacle 55 and a cover 57 therefor, and the casing and cover are adapted to be interconnected against displacement by suitable means (not shown).

Casing 55 and cover 57 are respectively provided with a pair of generally opposite end walls 59, 61, and sidewalls or sidewall means 63, 65 are respectively integrally formed with the end walls generally mating the casing and cover together thereby to define a chamber 67 within housing 31. A recess 69 is provided in cover end wall 61 opening into chamber 67, and a threaded opening 71 is provided through casing end wall 59 generally adjacent terminal 33 which is disposed therein. Terminal 33 has a portion extending exteriorly of housing 31 adapted for electrical connection with the power source, as previously mentioned, and a portion disposed interiorly of the housing and generally constituting a stationary contact 73. A pair of generally opposite guide or supporting slots or shoulders 75, 75*a* are integrally formed in sidewall means 63 of casing 55 for seating or abutment with a component of device 21, as discussed in greater detail hereinafter, and if desired, at least one support or step, as indicated at 77 may be provided on the free end of casing sidewall means generally adjacent the abutment thereof with cover sidewall means 65, as also discussed hereinafter. A pair of stepped openings or passages 79, 81 are defined in housing 31 generally between casing 55 and cover 57, and the openings extend through sidewall means 63, 65 so as to communicate or interconnect with chamber 67.

Starting controlling means or PTCR 35 is shaped generally cylindrically having a pair of generally flat sides or contact surfaces 83, 85 respectively embraced in both electrical contacting and mechanical positioning or supporting engagement by engagement members 37, 39, as previously mentioned. PTCR 35 is operable generally in response to current flow therethrough to increase its resistance generally as a function of its temperature so as to generate heat when energized. While PTCR 35 is illustrated herein as generally cylindrical in shape, it is contemplated that the PTCR may be afforded various other shapes within the scope of the invention.

Engagement means or members 37, 39 comprise a pair of generally thin, flat circular plates 87, 89 preferably formed of a material having good electrical transfer or conductive properties, and if desired, a plurality of indentations or dimples 91 may be provided in the plates to ensure good electrical contacting and mechanical positioning or supporting engagement with contact surfaces 83, 85 of PTCR 35. Plates 87, 89 are each provided with integral stepped extensions 93, 95 which terminate in integrally connected or formed receiving or connection means, such as yieldable, split sleeve contacts or electrical sockets 97, 99, for gripping or releasable receiving in electrical contact or circuit relation mounting plugs 45, 47 (as seen in FIG. 1) when device 21 is assembled thereon. Sockets 97, 99 are disposed within openings 79, 81 of casing 55 and cover 57 with stepped extensions 93, 95 supported or mounted on parts of the openings in the casing, and plate 87 may be provided with at least one generally radially extending support or finger 100 which is supported or mounted on the at least one supporting step 77 of the casing. Another extension, such as an electrical connection and mounting tab or flange 101, is integral with plate 87 adjacent its peripheral edge, and the tab is displaced or bent generally perpendicular to the plane of the plate. Resilient or biasing means, such as a spring 103 or the like, is associated with housing 31, i.e. disposed in recess 69 of cover 57, and engaged with plate 89 urging or biasing it into its electrical contacting and positioning engagement with side 83 of PTCR 35 so as to effect the electrical contacting and positioning engagement between the other side 85 of the PTCR and plate 87. While engagement members 37, 39 are illustrated herein for purposes of disclosure as being generally circular and flat in shape, it is contemplated that the engagement members may be formed with other shapes within the scope of the invention so as to effect the desired electrical contact and positioning engagements thereof with PTCR 35 in whatever shape it may be afforded. Further, while device 21 is shown having sockets 97, 99 for effecting a plug-on type assembly, as previously mentioned, it is contemplated that other terminals or electrical connectors may be formed integral with or electrically connected to plates 87, 89 within the scope of the invention for connection in circuit relation with motor winding circuit 23 of FIG. 1.

Connecting and mounting or supporting means, such as a current carrying circuit and structural component or metallic bracket 105, has a pair of integral arms 107, 109 extending or bent generally perpendicular to each other. Arm 107 is generally arcuate in shape so as to be, at least in part, somewhat flexible or resilient and has a pair of generally opposite ends or end portions 111, 113 received or mounted in guided or displacement preventing engagement within slots 75, 75a in casing sidewall means 63 so as to be seated in abutting engagement on casing 55. Arm 109 extends generally upwardly through slot 75 having a free end or end portion 115 connected both in electrical contacting and positioning or supporting engagement with tab 101 of engagement member 37 by suitable means, such as welding or the like (not shown). In this manner, bracket or coupling means 105 not only provides an electrical or circuit connection for coupling or passing current to engagement member 37 but also acts as a support or mounting means thereto. Further, it may also be noted that bracket 105 positively locates engagement member 37 and switch means 43 with respect to each other in housing 31 so that the switch means and PTCR 35 are disposed in predetermined spaced and thermal or heat transmitting relation, as discussed hereinafter. Arm 107 is provided with a centrally located aperture 117 therethrough, and a switch means supporting finger or flange 119 is lanced from the arm.

Interrupting means, such as current carrying thermal responsive switch means 43, is provided with a flexible switch member or blade 121 formed of a current carrying thermal responsive material, such as for instance a bimetal material. One end of switch blade 121 is electrically and structurally connected by suitable means, such as a rivet 123 or the like, to finger 119 lanced from arm 107 of bracket 105, and a movable contact 125 is carried on the other or opposite end of the switch blade, the movable contact being made or engaged with stationary contact 73 in the normal or at-rest position of the switch blade. To complete the description of device 21, an adjusting screw 127 extends through aperture 117 in arm 107 of bracket 105 into threaded adjusting engagement with threaded opening 71 in end wall 59 of casing 55 so as to be associated with housing 31, and the head of the adjusting screw bears against bracket arm 107 so as to deflect it for adjusting the bias on switch blade 121 urging its movable contact 125 into making engagement with stationary contact 73.

With the component parts of device 21 disposed in their at-rest positions as shown in FIGS. 1, 2 and 4 and as described hereinabove, it may be noted that circuit or circuit means 41 between terminal 33 and engagement member 37 includes switch means 43 and bracket 105 for supplying or passing current or power from power source L1, L2 to motor winding circuit 23. Further, it may also be noted that bracket 105 is serially connected in circuit relation between switch means 43 and engagement member 37 which is in turn adapted to be serially connected with run winding 27 in motor winding circuit 23 upon the assembly of device 21 onto mounting plugs 45, 47. Also when device 21 is so assembled to mounting plugs 45, 47, a parallel circuit is provided through the device from engagement member 37 through PTCR 35, and engagement member 39 to start winding 29 of motor winding circuit 23.

OPERATION

With device 21 assembled to mounting plugs 45, 47 so as to be connected in circuit relation with motor winding circuit 23 and with motor 25 connected across power terminals L1, L2, as shown in FIG. 1, current is supplied from power terminal L2 through lead 51 to terminal 33. From terminal 33, the current passes through circuit means 41 in housing 31 of device 21 via the making engagement of movable contact 125 with stationary contact 73, switch blade 121, bracket 105 and engagement member 37 to electrical socket 97 thereof which receives mounting plug 45 in electrical contacting engagement thereby to effect energization of run winding 27 in motor winding circuit. At the same time, current passes in parallel circuit relation from engagement member 37 through PTCR 35, engagement member 39 to electrical socket 99 thereof which receives mounting plug 47 in electrical contacting engagement thereby to effect energization of start winding 29 of motor winding circuit 23 generally simultaneously with the energization of run winding 27 so as to start or energize motor 25.

As previously mentioned, PTCR 35 is operable generally in response to the current flow to increase its resistance generally as a function of its temperature; therefore, assuming the temperature of the PTCR to be rather low at the starting or start-up period of motor 25, the PTCR will initially pass current at a value sufficiently great enough to effect a desired starting torque of the motor during the start-up period thereof. As the temperature of PTCR 35 increases in response to current flow therethrough, its resistance to such current flow also increases to a value which, in general, effects electrical disassociation of start winding 29 from circuit relation with run winding 27 in motor winding circuit 23. The point in time during the motor start-up period at which start winding 29 is rendered ineffective in motor winding circuit 23, i.e., electrically disassociated from run winding 27, as previously mentioned, may be predetermined so as to generally coincide with the desired running speed of motor 25. That is to say, start winding 29 may be disabled or rendered ineffective in motor winding circuit 23 generally about the time motor 25 attains its running speed. Of course, PTCR 35 will not act to obviate current flow through the aforementioned parallel circuit to start winding 29 during the running period of motor 25, but the PTCR will throttle or restrict the passage of such current flow to such a minimal or small value that the start winding is generally ineffective in motor winding circuit 23. It may be noted that heat generated during the start-up period and the running period of motor 25 is transmitted or radiated within chamber 67 of housing 31 toward bimetal switch blade 121 of switch means 43 which, as previously mentioned, is disposed by bracket 105 in predetermined spaced or heat transmitting relation with PTCR 35.

During the start-up and running periods of motor 25, switch means 43 is disposed in its circuit making or completing position in circuit 41 engaging movable contact 125 with stationary contact 73. In the circuit making position of switch means 43, bimetal switch blade 121 thereof is heated in response to current flow therethrough as well as the heat transmitted thereto from PTCR 35. When motor 25 is running or energized under normal operating conditions, the heat generated in bimetal switch blade 121 and the heat transferred thereto is predeterminately less than that necessary for effecting movement of the bimetal switch blade from its circuit making position toward a circuit breaking or interrupting position so as to disengage or break movable contact 125 from stationary contact 73.

In the event of the occurrence of an overload or high current condition, a relatively large amount of current may be drawn in motor winding circuit 23 which could deleteriously affect run winding 27 and start winding 29, as previously mentioned. However bimetal switch blade 121 is responsive to such high current drawn therethrough to correspondingly increase its generated heat thereby to effect characteristic actuation of the bimetal switch blade to its interrupting position breaking movable contact 125 from stationary contact 73 to interrupt or open circuit 41. In this manner, motor winding circuit 23 is automatically taken off the line to de-energize motor 25 in the event of the occurrence of an overload condition or winding circuit overload which may exist across line terminals L1, L2.

Of course, opening of circuit 41, as discussed above, also effects the de-energization of PTCR 35 and the resultant cooling of the PTCR and switch means 43. Even with the supplemental heat supplied or transferred from PTCR 35 to switch means 43, the switch means may cool sufficiently in its circuit interrupting position so as to cycle several or a plurality of times between its circuit interrupting position and the circuit completing position thereof. Such cycling of switch means 43 may occur throughout or over a period of a relatively short time and is effective to replace motor winding circuit 23 in circuit relation across power terminals L1, L2 for relatively very short periods of time; however, the period of time the motor winding circuit is thus cycled into circuit relation across the power terminal will not deleteriously affect the motor winding circuit since such time period is very short, as previously mentioned. When switch means 43 is so cycled to its circuit completing position, PTCR 35 is re-energized to again transmit heat to the switch means, and bimetal switch blade 121 is also again responsive to the overload condition to again generate heat during the aforementioned relatively short period of time thereby to again effect the cyclical movement of actuation of the switch means to its circuit interrupting position. Even in view of this cycling of switch means 43 for brief periods of time subsequent to the occurrence of the overload condition, it has been found that the supplemental heat transferred from PTCR 35 to the switch means is effective to increase the "off-time" thereof, i.e., when the switch means is in its circuit interrupting position, throughout the aforementioned relatively short period of time. Therefore, the increased "off-time" of device 21 occasioned by the supplemental heat transferred from PTCR 35 to switch means 43 allows the PTCR itself to cool. When the resistance and temperature of PTCR 35 are so reduced to a sufficiently low value, the PTCR will again permit the passage therethrough of current at sufficiently high enough values to again effect energization of start winding 29 in winding circuit 23 so as to restart motor 25. Therefore, when switch means 43 also cools enough to cycle back to its circuit completing position and remain there, current is drawn through PTCR 35 at values great enough to effect the re-energization of start winding 29 to aid re-energized run winding 27 in motor winding circuit 23 in bringing motor 25 up to its running speed. When motor 25 attains its running speed, the self-heating effect of PTCR 35 once again raises its temperature and resistance to reduce current flow therethrough to a value rendering start winding 29 ineffective in motor winding circuit 23. Thus, restarting of motor 25 assumes that the cause of the overload condition has been alleviated or corrected, and if not so alleviated, device 21 may again operate or function as above described to take motor 25 off the line across power terminals L1, L2.

Figure 5:
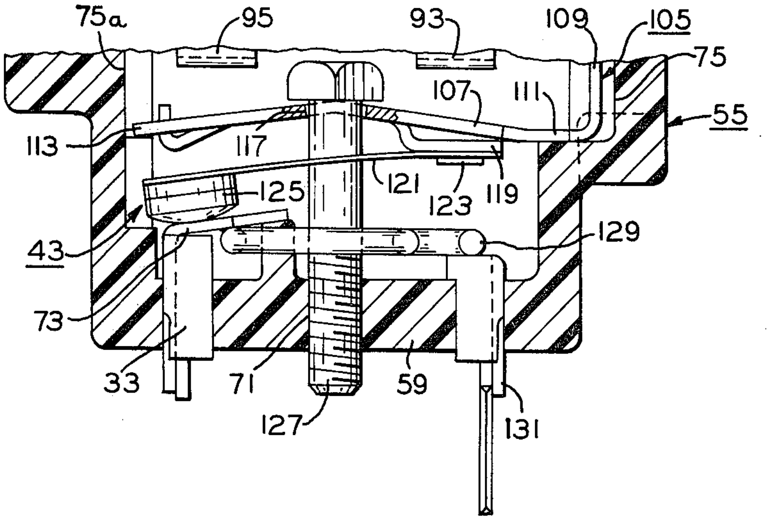
FIGS. 5 and 6 are partial sectional views taken from FIGS. 2 and 3 showing alternative constructions for the devices which have a heater element connected therein also in one form of the invention, respectively.

In FIG. 5, an alternative construction in one form of the invention which may be incorporated into device 21 is shown wherein means, such as a heating element or resistance coil 129 or the like, for heating switch means 43 is connected in series relation between stationary contact 73 and another terminal 131 disposed through end wall 59 of casing 55 and adapted for connection by lead 51 with power terminal L2, FIG. 1. In this alternative construction of device 21, the portion of terminal 33 externally of casing 55 is unnecessary and may be eliminated, as illustrated in FIG. 5.

Referring now to FIG. 3, another combination starter-protector device 133 in one form of the invention is shown having generally the same component parts and functioning generally in the same manner as device 21 with the exceptions discussed below, and it is believed that device 133 may have additional objects and advantageous features of its own as well as meeting at least some of the objects and advantageous features noted hereinabove with respect to device 21.

In device 133, another terminal 135 is mounted or disposed in end wall 59 of casing 55 and has a portion within chamber 69 comprising another stationary contact 137. Other interrupting means, such as switch means 139, is generally constituted by a generally disc-shaped switch member or actuator 141 formed of a current carrying thermal responsive material, such as a bimetal material, and a pair of movable contacts 143, 145 are mounted to the switch actuator being disposed in making engagement with stationary contacts 73, 137 when the switch actuator is in its generally at-rest position. Switch actuator 141 is generally centrally mounted to or carried on an adjusting screw 147 which is adjustably received in threaded engagement with threaded opening 71 in casing end wall 59 to adjust the bias on the switch actuator urging its movable contacts 143, 145 into making engagement with stationary contacts 73, 137. Another connecting and mounting means, or coupling such as a current carrying circuit and structural component or metallic bracket 149 has a pair of arms 151, 153 bent from an integral intermediate portion 155 so as to extend in generally parallel planes, and the arms have free or opposite ends or end portions which are connected both in electrical contacting and positioning or supporting engagement with terminal 135 and tab 101 of engagement member 37 by suitable means, such as welding or soldering or the like (not shown). In this manner, bracket 149 is connected or coupled in series circuit relation with stationary contact 137 between switch means 139 and engagement member 37. Although intermediate portion 155 of bracket 149 is shown displaced from engagement with casing 55 within slot 75, if desired, it is contemplated that the intermediate portion could be seated in the slot on the casing within the scope of the invention. It is also contemplated that bracket 149 may be afforded a shape other than that shown for purposes of disclosure within the scope of the invention.

With the component parts of device 133 disposed in their generally at-rest positions as shown in FIGS. 3 and 4 and as described hereinabove, circuit 41 between terminal 33 and engagement member 37 includes switch means 139, terminal 135 and bracket 149 for passing or supplying current from power source L1, L2 to motor winding circuit 23. Further, it may also be noted that bracket 149 is serially connected in circuit relation between switch means 139 and engagement member 37 which in turn is adapted to be serially connected with run winding 27 in motor winding circuit 23 upon the assembly of device 133 onto mounting plugs 45, 47. Also, when device 133 is so assembled to mounting plugs 45, 47, the parallel circuit is effected through the device from engagement member 37 through PTCR 35 and engagement member 39 to start winding 29 of motor winding circuit 23.

With device 133 assembled to mounting plugs 45, 47 so as to be connected in circuit relation with motor winding circuit 23 and with motor 25 connected across power terminals L1, L2, as shown in FIG. 1, current is supplied from power terminal L2 through lead 51 to terminal 33 and therefrom through switch actuator 141 and the making engagement of its movable contacts 143, 145 with stationary contacts 73, 137, bracket 149 and engagement member 37 to electrical socket 97 thereof thereby to effect energization of run winding 27 in the motor winding circuit. At the same time, current is also passed from engagement member 37 through the aforementioned parallel circuit to effect energization of start winding 29 in winding circuit 23 generally simultaneously with the energization of run winding 29 so as to start or energize motor 25. Switch means 139 functions in device 133 in the same manner as the corresponding switch means 43 in device 21 for protecting motor winding circuit 23 in the event of the occurrence of an overload condition across power terminals L1, L2.

Figure 6:
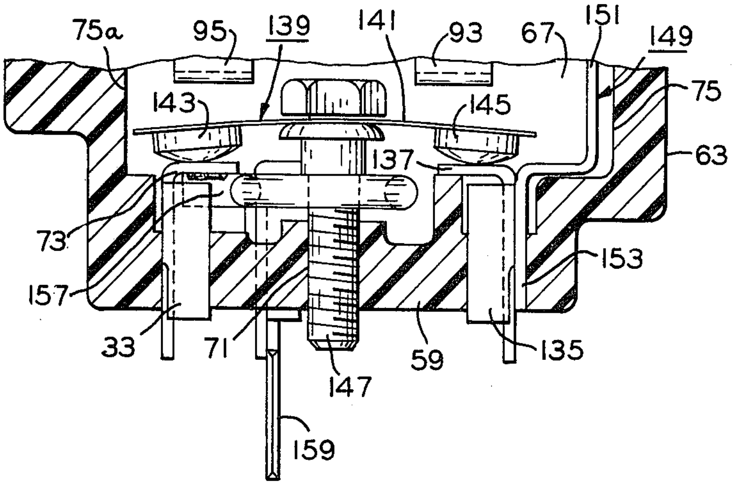

In FIG. 6, an alternative construction in one form of the invention which may be incorporated into device 133 is shown wherein means, such as a heating element or resistance coil 157 or the like, for heating switch means 139 is connected in series relation between stationary contact 73 and another terminal 159 disposed through end wall 59 of casing 55 and adapted for connection by lead 59 with power terminal L2, FIG. 1. In this alternative construction of device 133, the portion of terminal 33 externally of casing 55 is unnecessary and may be omitted as illustrated in FIG. 6.

Figure 7:
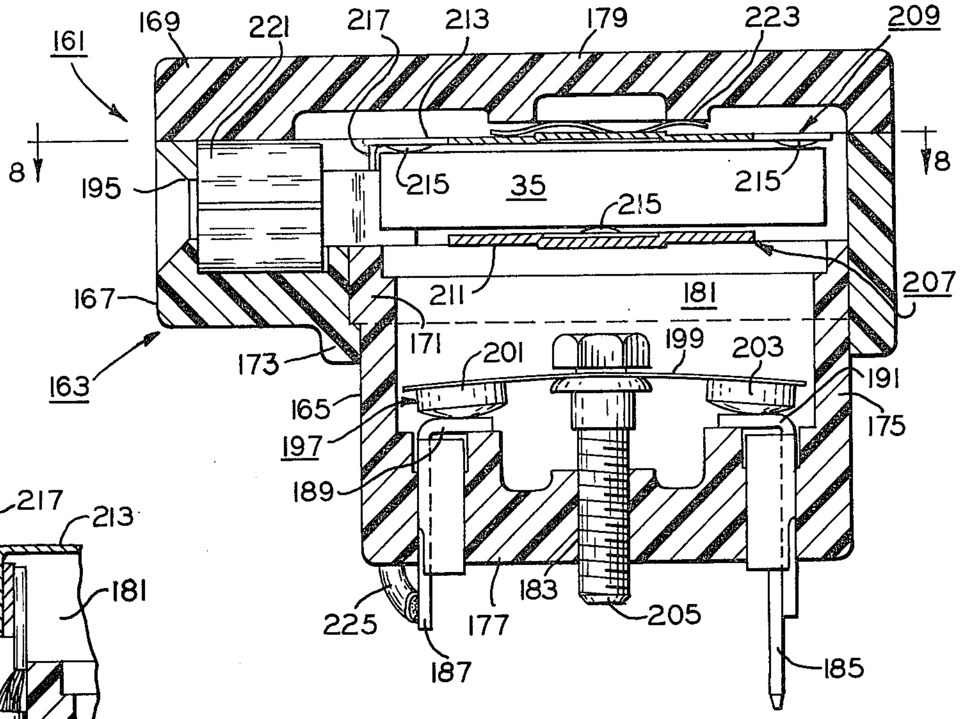
FIG. 7 is a sectional view illustrating another alternative combination starter-protector device in one form of the invention in cross-section.
Figure 9:
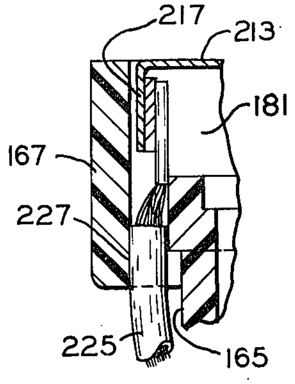
FIGS. 8 and 9 are sectional views taken generally along lines 8—8 and 9—9 of FIGS. 7 and 8, respectively.
Figure 8:
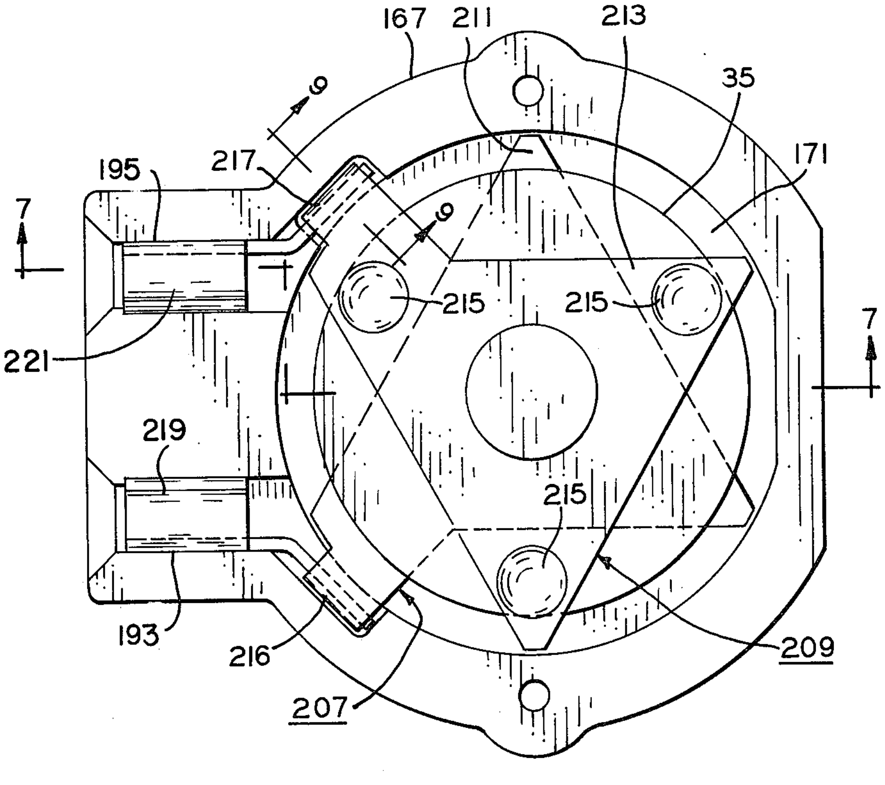

Referring now to FIGS. 7-9, another combination starter-protector device 161 in one form of the invention is shown having generally the same component parts and functioning generally in the same manner as devices 21, 133 with the exceptions discussed hereinbelow, and it is believed that device 161 may have additional objects and advantageous features of its own as well as meeting at least some of the objects and advantageous features set out hereinabove with respect to devices 21, 133.

Device 161 is provided with a housing 163 comprising a casing or receptacle 165, an intermediate portion 167 and a cover 169 which are adapted to be interconnected against displacement by suitable means (not shown). Casing 165 and intermediate portion 167 are respectively provided with generally annular overlapping or interfitting flanges 171, 173 which are abutted together, and interconnecting sidewalls or sidewall means 175 are respectively formed on the casing and the intermediate portion. An end wall 177 is integrally formed with the sidewall means of the casing, and another end wall 179 is provided on cover 169 generally opposite end wall 179 thereby to define with sidewall means 175 a chamber 181 within housing 163. A threaded opening 183 is provided through casing end wall 177, and a pair of terminals 185, 187 are disposed in the end wall so as to extend therethrough generally adjacent the threaded opening. Terminal 185 is adapted for electrical connection with a power terminal L2 by lead 51, FIG. 1, and terminals 185, 187 each include a portion disposed within chamber 181 comprising a pair of stationary contacts 189, 191. A pair of stepped openings or passages 193, 195 are defined in housing 163 generally between intermediate portion 167 and cover 169, and the openings extend through sidewall means 175 so as to communicate or interconnect with the chamber.

Interrupting means, such as a current carrying thermal responsive switch means 197, is provided with a flexible, generally disc-shaped, switch member or actuator 199 formed of a current carrying responsive material, such as bimetal material, and a pair of movable contacts 201, 203 are mounted to the switch actuator being disposed in making engagement with stationary contacts 189, 191 when the switch actuator is in its generally at-rest position. Switch actuator 199 is generally centrally mounted to or carried on an adjusting screw 205 which is adjustably mounted in threaded opening 183 in casing end wall 177 to adjust the bias on the switch actuator urging its movable contacts into making engagement with its stationary contacts.

A pair of means, such as mounting plates or members 207, 209, are mounted in housing 163 for electrical contact and positioning or supporting engagement with PTCR 35, and the engagement means or members are adapted to be connected in circuit relation with run winding 27 and start winding 29 of motor winding circuit 23 as seen in FIG. 1. Engagement members 207, 209 comprise a pair of generally thin, flat, triangularly shaped plates 211, 213 preferably formed of a material having good electrical properties, and, if desired, a plurality of indentations or dimples 215 may be provided in the plates to ensure good electrical contacting and mechanical positioning or supporting engagement with contact surfaces 83, 85 of PTCR 35. Plates 211, 213 are respectively provided with integral extensions 216, 217 which are respectively integrally formed or electrically and mechanically connected by suitable means, such as welds or the like (not shown), with a pair of yieldable, split sleeve contacts or electrical sockets 219, 221 for gripping or receiving in electrical contact or circuit relation mounting plugs 47, 45 (as seen in FIG. 1) when device 161 is assembled thereon. Sockets 219, 221 are disposed within openings 193, 195 of housing 163, and plate 211 has its triangular tips or marginal edges supported or mounted on annular flange 171 of casing 165. Resilient or biasing means, such as a wavey annular spring 223 or the like, is associated with housing 163 so as to be disposed in biasing engagement between end wall 179 of cover 169 and plate 213 urging or biasing it into its electrical contacting and positioning engagement with side 83 of PTCR 35 so as to effect the electrical contacting and positioning engagement between the other side 85 of PTCR and plate 211. While engagement members 207, 209 are illustrated herein for purposes of disclosure, as being generally triangular and flat in shape, it is contemplated that other engagement members may be provided having other shapes within the scope of the invention so as to effect the electrical contact and positioning engagement with PTCR 35 in whatever shape it may be afforded. Further, while device 161 is shown having sockets 219, 221 for effecting a plug-on type assembly, as previously mentioned, it is contemplated that other types terminals or electrical connections may be formed integrally with or electrically connected to plates 211, 213 within the scope of the invention for electrical circuit relation with motor winding circuit 23 of FIG. 1.

As shown in FIG. 9, connecting connection, or coupling means, such as an insulated lead 225 or the like, has one end connected by suitable means, such as soldering, welding, crimping or the like (not shown), with extension 217 of plate 213 within chamber 181, and a passage 227 is provided through intermediate portion 167 of housing 163 to accommodate the lead which extends at least in part exteriorly of the housing and has its other end connected by suitable means, such as welding, soldering, crimping or a quick disconnect fitting (not shown), to terminal 187 as best seen in FIG. 7.

With the component parts of the device 161 disposed in their at-rest positions as shown in FIGS. 7–9 and as described hereinabove, it may be noted that circuit 41 between terminal 185 and engagement member 209 includes switch means 197 having its movable contacts 201, 203 in making engagement with stationary contacts 189, 191, terminal 187, and lead 225 wherein current or power is passed or supplied from power source L1, L2 to motor winding circuit 23 of FIG. 1. It may also be noted that lead 225 is serially connected in circuit relation between switch means 197 and engagement member 209 which is in turn adapted to be serially connected with run winding with circuit 23 upon the assembly of device 161 onto mounting plugs 45, 47. Also when device 161 is so assembled to mounting plugs 45, 47, the aforementioned parallel circuit is provided through the device from engagement member 209 through PTCR 35 and engagement member 211 to start winding 29 of motor winding circuit 23.

With device 161 assembled to mounting plugs 45, 47 so as to be connected in circuit relation with motor winding circuit 23 and with motor 25 connected across power terminals L1, L2 as shown in FIG. 1, current is supplied from power terminal L2 through lead 51 to terminal 185 and therefrom through switch means 197 and the making engagement of its movable contacts 201, 203 with stationary contacts 189, 191, terminal 187, lead 225 and engagement member 209 to electrical socket 221 thereof thereby to effect energization of run winding 27 in the motor winding circuit. At the same time, current is also passed through engagement member 209 to the aforementioned parallel circuit to affect energization of start winding 29 in winding circuit 23 generally simultaneously with the energization of run winding 29 so as to start or energize motor 25. Switch means 197 and PTCR 35 function in device 161 in the same manner as the respective corresponding switch means 43, 139 in devices 21, 133 for protecting motor winding circuit 23 in the event of the occurrence of an overload condition across power terminals L1, L2.

Figure 10:
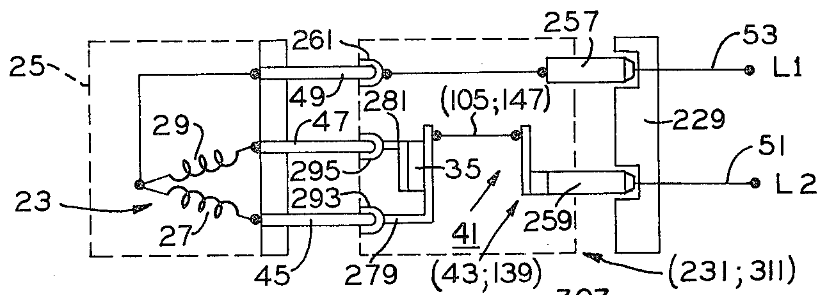
FIG. 10 is a diagrammatic view of another winding circuit for another dynamoelectric machine showing schematically therein another combination starter-protector device in one form of the invention.

In FIG. 10, a multiple connector or female plug 229 is shown connected by leads 51, 53 to power terminals L1, L2 and assembled with another combination starter-protector device 231 in one form of the invention which, in turn, is assembled on mounting plugs 45, 47, 49 so as to be connected in circuit relation with winding circuit with motor 25.

Figure 11:
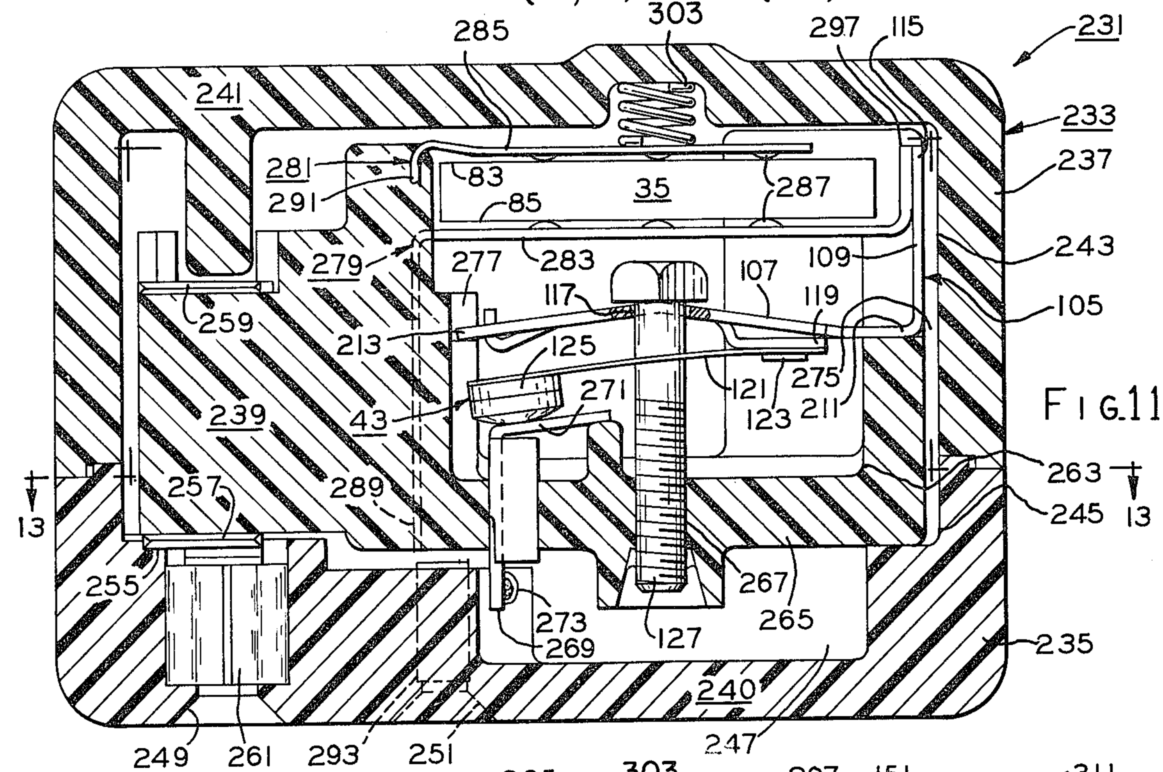
FIGS. 11 and 12 are sectional views respectively illustrating other alternative combination starter-protector devices, each in one form of the invention, in cross-section.
Figure 13:
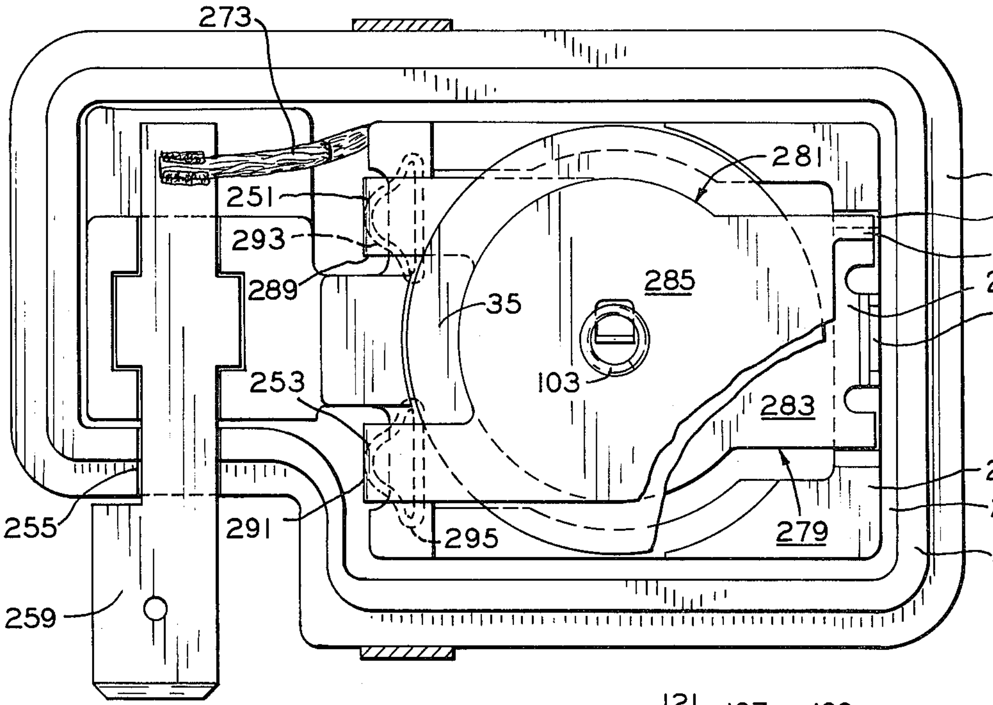
FIG. 13 is a sectional view taken generally along line 13—13 of FIGS. 11 and 12, respectively, being common thereto.

As shown in FIGS. 11 and 13, device 231 has generally the same component parts and functions generally in the same manner as devices 21, 133, 161 with the exceptions discussed below, and it is believed that device 231 may have additional objects and advantageous features of its own, which will become apparent or be pointed out hereinafter, as well as meeting at least some of the objects and advantageous features set out hereinbefore with respect to devices 21, 131, 161.

Device 231 is provided with a housing 233 comprising a casing 235, a cover 237 therefore, and an interior intermediate member or mounting component 239 is caged or disposed in abutment between the casing and cover which are releasably retained against displacement by suitable means (not shown). Casing 235, cover 237 and mounting component 239 are formed from any suitable material having good electrical insulating properties. A pair of generally opposite end walls 240, 241 are provided on casing 235 and cover 237, and sidewalls or sidewall means 243, 245 are integrally formed with the end walls generally mating the casing and cover together thereby to define a chamber 247 within housing 233 in which mounting component 239 is disposed. Casing 235 is provided with a plurality of openings or socket receiving passages 249, 251, 253 which extend through casing end wall 240 so as to communicate or connect with chamber 247, and the casing and cover 237 are provided with a common terminal receiving slot or opening 255 through sidewall means 243, 245 thereof. A pair of terminals or terminal means 257, 259 extend through common slot 255, and terminal 257 has an interior portion which is connected in electrical and mechanical engagement with means, such as a yieldable split sleeve contact, socket or terminal means, 261 for grippingly receiving in electrical contact or circuit relation mounting plug 49 (as seen in FIG. 10) when device 231 is assembled thereon. Socket 261 is disposed within opening 249 in casing end wall 239, and a portion of mounting component 239 is disposed in overlaying abutting engagement with terminal 257 to maintain it against displacement from the opening and common slot 255 in casing 235. Terminal 259 is mounted in displacement preventing engagement between mounting component 239 and a portion of cover end wall 241, and terminals 257, 259 are adapted for plug-on electrical connection or assembly with female plug 229, as shown in FIG. 10.

Mounting component 239 is provided with a recess 263 and has a base wall 265 with a threaded opening 267 therethrough. A terminal 269 is disposed in base wall 265, and one of the opposite end portions of the terminal comprises a stationary contact 271 within recess 263 while the other of the opposite end portions of the terminal is connected in circuit relation with terminal 259 by a lead 273.

Connecting and mounting means or coupling means, such as current carrying circuit and structural component or metallic bracket 105 is mounted within recess 263, and opposite ends 111, 113 of bracket arm 107 is received or mounted in guided or displacement preventing engagement within a pair of opposite slots 275, 277 in mounting component 239 so as to be seated in abutting engagement on the mounting component. Arm 109 of bracket 105 extends generally upwardly up through slot 275.

Interrupting means, such as current carrying thermally responsive switch means 43, has switch actuator or blade 121 electrically and structurally connected by rivet 123 to finger 119 lanced from arm 107 of bracket 105, and movable contact 125 is carried on the other or opposite end of the switch actuator being made or engaged with stationary contact 271 in the normal or at-rest position of the switch actuator. Adjusting screw 127 extends through aperture 117 in arm 107 of bracket 105 into threaded adjusting engagement with threaded opening 267 in base wall 265 of mounting component 239, and the adjusting screw bears against bracket arm 107 so as to deflect it for adjusting the bias on switch actuator 121 urging its movable contact 125 into making engagement with stationary contact 271.

A pair of means, such as mounting plates or members 279, 281 are mounted in recess 263 of mounting component 239 for electrical contact and positioning or supporting engagement with PTCR 35, and engagement means or members 279, 281 are adapted to be connected in circuit relation with run winding 27 and start winding 29 of winding circuit 23, as shown in FIG. 10. Engagement members 279, 281 comprise a pair of generally thin flat circular plates 283, 285 preferably formed of a metal having good electrical properties, and if desired, a plurality of indentations or dimples 287 may be provided in the plates to ensure good electrical contacting and positioning or supporting engagement with contact surfaces 83, 85 of PTCR 35. Plates 283, 285 are provided with a pair of integral extensions 289, 291 which are bent therefrom and the extensions are integrally formed, i.e. electrically and structurally connected, with a pair of means, such as yieldable split sleeve contacts, electrical sockets or terminal means 293, 295 for gripping or releasably receiving in electrical contact or circuit relation mounting plugs 45, 47 (as seen in FIG. 10) when device 231 is assembled thereon. While only extension 289 is shown in FIG. 11, both extensions 289, 291 extend generally along mounting component 239 in chamber 247, and sockets 293, 295 are disposed within openings 251, 253 in casing end wall 239. Another extension, such as an electrical connection and mounting tab or flange 297, is integral with plate 283 adjacent its peripheral edge and at least a part of the tab is bent generally perpendicularly to the plane of the plate so as to be disposed immediately adjacent free end 115 of bracket 105 as best seen in FIG. 11. Tab 297 and free end 115 of bracket 105 are electrically and structurally interconnected by suitable means, such as a weld (not shown), so that the bracket not only provides an electrical or circuit connection for passing current to the engagement member but also acts as a support or mounting means therefore. Further it may be noted that bracket 105 positively locates engagement member 279 and switch means 43 with respect to each other in housing 233 so that the switch means and PTCR 35 are disposed or predeterminately spaced in thermal or heat transmitting relation. Of course, PTCR 35 has its opposite contact surface 83, 85 respectively connected in electrical contacting engagement between plates 283, 285, and another tab 299 is integrally formed generally at the peripheral edge of plate 285 and supported on cooperating abutment surfaces 301 provided on mounting component 239. Resilient means, such as a spring 303 or the like, is associated with housing 233 being disposed between end wall 241 of cover 237 and plate 285 so as to urge it towards its electrical contact and positioning engagement with contact surface 83 of PTCR 35 and to urge contact surface 85 thereof toward its electrical contacting and positioning engagement with plate 283.

With the component parts of device 231 disposed in their at-rest positions as shown in FIGS. 11 and 13 and as described hereinabove, it may be noted that circuit 41 between terminal 259 and engagement member 279 includes lead 273, terminal 269, switch means 43 and bracket 105 for passing current or power from power sources L1, L2 to motor winding circuit 23. Further it may also be noted that bracket 105 is serially connected in circuit relation between switch means 43 and engagement member 279 which in turn is adapted to be serially connected with run winding 27 in motor winding circuit 23 upon the assembly of device 231 onto mounting plugs 45, 47, 49. Also, when device 231 is assembled to mounting plugs 45, 47, 49, a parallel circuit is provided through the device from engagement member 279 thrugh PTCR 35 and engagement member 281 to start winding 29 of motor winding circuit 23.

With device 231 assembled to mounting plugs 45, 47, 49 so as to be connected in circuit relation in motor winding circuit 23 and with motor 25 connected across power terminals L1, L2 as shown in FIG. 10, current is supplied from power terminals L2 through lead 51 and female plug 229 to terminal 259 and therefrom through lead 273, terminal 269, switch means 43 and the making engagement of its movable contact 125 with stationary contact 271, bracket 105 and engagement member 279 to electrical socket 293 thereof to effect energization of run winding 27 in the motor winding circuit. At the same time, current is also passed from engagement member 279 through the aforementioned parallel circuit generally constituted by PTCR 35, engagement member 281 and its electrical socket 295 thereby to effect energization of start winding 29 in winding circuit 23 generally simultaneously with the energization of run winding 27 so as to start or energize motor 25. A return from motor winding circuit 23 is provided through mounting plug 49 received in socket 261 of terminal 257 which, in turn, is received by female connection 229, and therefrom through lead 53 to power terminal L2. Of course, device 231 is operable generally in the same manner as the previously described devices to effect the energization of motor 25 with PTCR 35 rendering start winding 29 ineffective in winding circuit 23 generally at the running speed of the motor and transmitting heat to switch means 43, and the switch means functions in device 231 in the same manner as it did in device 21 for protecting motor winding circuit 23 in the event of an occurrence of an overload condition across power terminals L1, L2.

Figure 14:
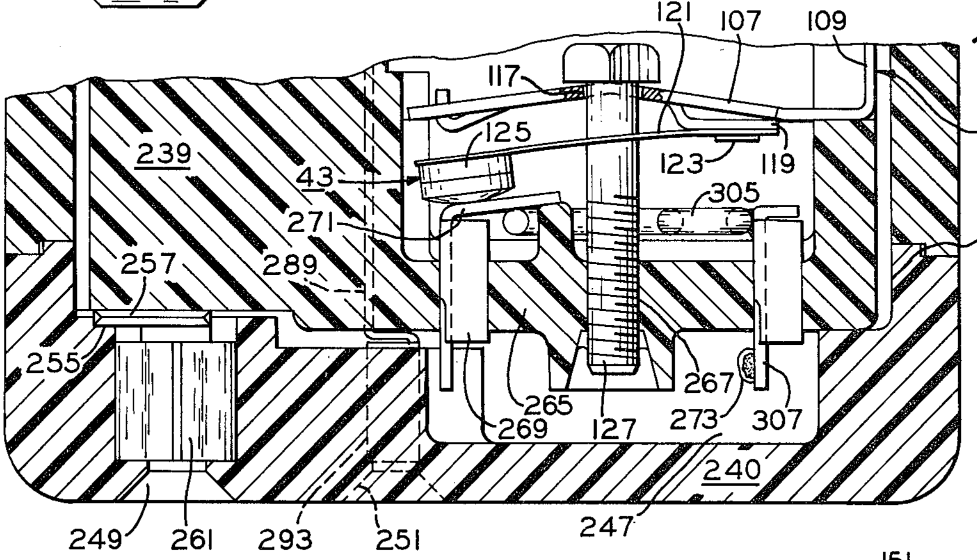
FIGS. 14 and 15 are partial sectional views taken from FIGS. 11 and 12 showing a heater element connected therein, respectively.

In FIG. 14, an alternative construction in one form of the invention which may be incorporated into device 231 is shown wherein means, such as a heating element or resistance coil 305 or the like, for heating switch means 43 is connected in series relation between stationary contact 271 and another terminal disposed in base wall 265 of mounting component 239. In this alternative construction, lead 273 is connected to terminal 307 instead of terminal 269.

Figure 12:
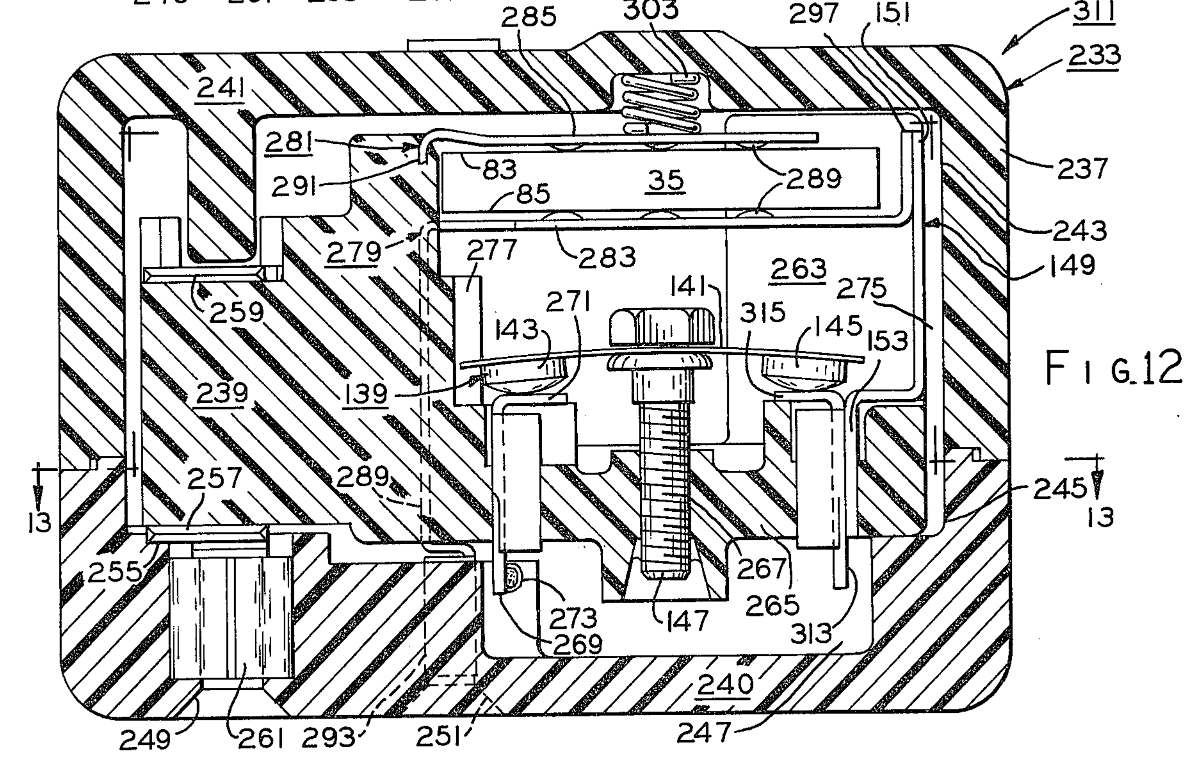

Referring now to FIGS. 12 and 13 another combination starter-protector device 311 in one form of the invention is shown having generally the same component parts and functioning generally in the same manner as device 231 with the exceptions discussed below, and it is believed that device 311 may have additional objects and advantageous features, which will become apparent or be pointed out in the following discussion, as well as meeting at least some of the objects and advantageous features set out hereinbefore.

In device 311, another terminal 313 is mounted or disposed in base wall 265 of mounting component 237 and has a portion within recess 263 comprising another stationary contact 315. Bracket 149 has its arms 151, 153 connected by suitable means, such as welding or the like (not shown) to terminal 313 and tab 297 of engagement member 279. Switch means 139 has its switch actuator 141 mounted to adjusting screw 147 which is adjustably threadedly received in threaded opening 267 in base wall 265 of mounting component 239. The adjustable threaded engagement of adjusting screw 147 in threaded opening 267 adjusts the bias of switch actuator 141 urging its movable contacts 143, 145 into making engagement with stationary contacts 271, 315 in the generally at-rest position of the switch actuator. In this manner, bracket 149 is connected in series circuit relation with stationary contact 315 between switch means 139 and engagement member 279 as well as supporting or positioning the engagement member within housing 233.

With the component parts of device 311 in their generally at-rest positions as shown in FIGS. 12 and 13 and as described above, circuit 41 between terminal 269 and engagement member 279 includes switch means 139 having its movable contacts 143, 145 made with stationary contacts 271, 315, terminal 313 and bracket 149 for passing or supplying current from power source L1, L2 to motor winding circuit 23. Further, it may also be noted that bracket 149 is serially connected in circuit relation between switch means 139 and engagement member 279 which in turn is adapted to be serially connected with run winding 27 in motor winding circuit 23 upon the assembly of device 311 onto mounting plugs 45, 47, 49, as seen in FIG. 10. Also when device 311 is so assembled to mounting plugs 45, 47, 49, the parallel circuit is effected through the device from engagement member 279 through PTCR 35, engagement member 281 and its socket 295 to start winding 29 of motor winding circuit 23.

With device 311 assembled to mounting plugs 45, 47, 49 so as to be connected in circuit relation in motor winding circuit 23 and with motor 25 connected across power terminals L1, L2 as shown in FIG. 10, current is supplied from power terminals L2 through lead 51 and female plug 229 to terminal 259 and therefrom through lead 273, terminal 269, switch means 139 and the making engagement of its movable contacts 143, 145 with stationary contacts 271, 315, terminal 311, bracket 149 and engagement member 279 to electrical socket 293 thereof thereby to effect energization of run winding 27 in the motor winding circuit. At the same time, current is also passed from engagement member 279 through the aforementioned parallel circuit comprising PTCR 35, engagement member 281 and its electrical socket 295 thereby to effect energization of start winding 29 in winding circuit 23 generally simultaneously with the energization of run winding 27 so as to start or energize motor 25. A return from motor winding circuit 23 is provided through mounting plug 49 received in socket 261 of terminal 257 which, in turn, is received by female connection 229, and therefrom through lead 53 to power terminal L2. Of course, device 311 is operable in the same manner as the previously described devices to effect the energization of motor 25 with PTCR 35 rendering start winding 29 ineffective in winding circuit 23 generally at the running speed of the motor and transmitting heat to switch means 139, and the switch means functions in device 311 in the same manner as it did in device 133 for protecting motor winding circuit 23 in the event of an occurrence of an overload condition across power terminals L1, L2.

Figure 15:
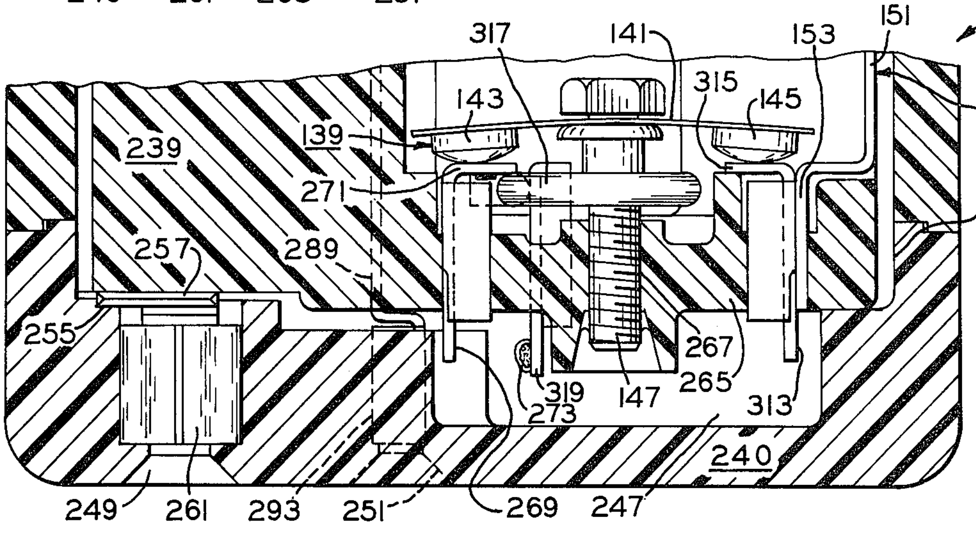

In FIG. 15, an alternative construction in one form of the invention which may be incorporated into device 311 is shown whereon means, such as a heating element or resistance coil 317 or the like, for heating switch means 139 is connected in series relation between stationary contact 271 and another terminal 319 disposed in base wall 265 of mounting component 239. In this alternative construction, leas 273 is connected to terminal 319 instead of terminal 269.

From the foregoing, it is now apparent that novel combination starter-protector devices 21, 133, 161, 231, and 311 and other alternative constructions have been provided meeting the objects and advantages set out hereinbefore, as well as others, and that changes may be made by those having ordinary skill in the art as to the precise arrangements, shapes, connections and details of the constructions set forth herein for purposes of disclosure without departing from the spirit of the invention or the scope thereof which is set out by the claims which follow.

What we claim as new and desire to secure by Letters Patent of the U.S. is:

1. A combination starter-protector device for a winding circuit of a dynamoelectric machine adapted to be energized from a power source comprising a housing, a solid state component in said housing adapted to control starting of the dynamoelectric machine, a pair of means mounted generally in stationary positions in said housing for electrical contact and positioning engagement with said solid state component, respectively, said engagement means including means integrally formed therewith and adapted for connection in circuit relation with the winding circuit, respectively, and circuit means electrically connected with one of said engagement means and adapted to be connected in circuit relation with the power source and including means disposed in said housing generally in spaced relation adjacent said solid state component and operable generally in response to a predetermined thermal condition occasioned upon winding circuit overload for interrupting said circuit means.

2. A combination starter-protector device as set forth in claim 1 wherein said solid state component comprises a PTCR.

3. A combination starter-protector device as set forth in claim 1 wherein said connection means comprise a pair of electrical sockets, respectively.

4. A combination starter-protector device as set forth in claim 1 wherein said interruption means comprises a thermally responsive current carrying switch member movable from a position completing said circuit means toward a position interrupting said circuit means in the event of the occurrence of the predetermined thermal condition.

5. A combination starter-protector device as set forth in claim 1 wherein said circuit means further includes means for mounting said interrupting means in said housing generally in the spaced relation adjacent said solid state component and for electrically connecting said interrupting means in the circuit relation with said one engagement means.

6. A combination starter-protector device as set forth in claim 5 further comprising means for adjustably urging said interrupting means toward a position in said housing completing said circuit means.

7. A combination starter-protector device as set forth in claim 1 wherein said circuit means further includes a contact in said housing adapted to be electrically connected with the power source, said interrupting means being engaged with said contact to complete said circuit means and being disengaged from said contact to effect the interruption of said circuit means in the event of the occurrence of the predetermined thermal condition.

8. A combination starter-protector device as set forth in claim 1 wherein said circuit means further includes a pair of contacts in said housing, one of said contacts being adapted for electrical connection with the power source, and means for electrically connecting the other of said contacts with said one engagement means and for supporting said one engagement means in said housing, said interrupting means being operable from a position engaged with said contacts so as to complete said circuit means toward a position disengaged from said contacts to effect the interruption of said circuit means in the event of the occurrence of the predetermined thermal condition.

9. A combination starter-protector device as set forth in claim 1 wherein said circuit means further includes a pair of terminals disposed in said housing, said interrupting means being engaged with said terminals to complete said circuit means and being operable to disengage said terminals so as to affect the interruption of said circuit means in the event of the occurrence of the predetermined thermal condition, one of said terminals being adapted for electrical connection with the power source, and means for electrically connecting said other of said terminals with said one engagement means, said electrically connecting means extending at least in part exteriorly of said housing to connect with said other terminal.

10. A combination starter-protector device for a winding circuit of a dynamoelectric machine having a run winding and a start winding adapted to be energized from a power source, said combination starter-protector device comprising a housing, at least one terminal in said housing adapted to be connected to the power source, a PTCR in said housing and adapted to control energization of the start winding, a pair of means mounted in said housing for electrical contact and positioning engagement with said PTCR and including integrally formed means adapted for connection in circuit relation with the start winding and the run winding, respectively, and circuit means between one of said engagement means and said at least one terminal including means in said housing and operable generally in responseto a predetermined thermal condition occasioned upon winding circuit overload for interrupting said circuit means.

11. A combination starter-protector device as set forth in claim 10 wherein said circuit means further includes means associated with said interrupting means for coupling said at least one terminal in circuit relation with said one engagement means.

12. A combination starter-protector device as set forth in claim 10 wherein said circuit means further includes another terminal in said housing, a connection extending at least in part exteriorly of said housing between said another terminal and said one engagement means, and said interrupting means comprising a bimetal switch element for making and breaking engagement with said at least one terminal and said another terminal.

13. A combination starter-protector device as set forth in claim 10 wherein said circuit further means includes means for mounting said interrupting means in said housing and for electrically connecting it in circuit relation with said one engagement means.

14. A combination starter-protector device as set forth in claim 10 further comprising means associated with said housing for generally maintaining the electrical contact and positioning engagement of said engagement means with said PTCR.

15. A combination starter-protector device as set forth in claim 10 further comprising means for biasing one of said one engagement means and the other of said engagement means toward the electrical contact and positioning engagement thereof with said PTCR so as to also bias it toward the electrical contact and positioning engagement with the other of said one engagement means and said other engagement means.

16. A combination starter-protector device as set forth in claim 10 wherein said connection means comprise a pair of electrical socket means disposed generally within said housing for the connection in the circuit relation with the run winding and the start winding, respectively.

17. A combination starter-protector device as set forth in claim 10 wherein said engagement means comprise a pair of metallic plates respectively connected in circuit relation across said PTCR.

18. A combination starter-protector device as set forth in claim 10 wherein said engagement means and said housing respectively included means for abutment so as to maintain said engagement means generally against displacement movement in said housing.

19. A combination starter-protector device as set forth in claim 10 wherein said interruption means comprises a thermally responsive current carrying switch means movable between a position completing said circuit means and another position to effect the interruption of said circuit means in the event of the occurrence of the predetermined thermal condition.

20. A combination starter-protector device as set forth in claim 19 wherein said switch means comprises a bimetal element.

21. A combination starter-protector device as set forth in claim 10 wherein said circuit means further includes means for electrically coupling said interrupting means and said one engagement means so as to connect said at least one terminal in circuit relation through said interrupting means with said one engagement means.

22. A combination starter-protector device as set forth in claim 21 wherein said coupling means includes means for mounting said interruption means in said housing.

23. A combination starter-protector device as set forth in claim 22 further comprising means adjustably associated with said housing and said mounting means for adjustably urging said interrupting means toward a position in said housing completing said circuit means.

24. A combination starter-protector device as set forth in claim 21 wherein said coupling means comprises a metallic bracket.

25. A combination starter-protector device as set forth in claim 10 wherein said circuit means further includes another terminal disposed in said housing, said interrupting means being operable from a position engaged with said at least one terminal and said another terminal so as to complete said circuit means toward another position disengaged from said at least one terminal and said another terminal to effect the interruption of said circuit means in the event of the occurrence of the predetermined thermal condition.

26. A combination starter-protector device as set forth in claim 25 wherein said circuit means further includes a metallic bracket electrically coupled between said another terminal and said one engagement and disposed in supporting engagement with said one engagement means.

27. A combination starter-protector device as set forth in claim 25 wherein said circuit means further includes means for electrically coupling said another terminal with said one engagement means, said coupling means extending at least in part exteriorly of said housing so that an electrical connection of said coupling means with said another terminal is exteriorly of said housing.

28. A combination starter-protector device as set forth in claim 10 further comprising means adjustably associated with said housing and said interrupting means for adjustably urging said interrupting means toward a position completing said circuit means.

29. A combination starter-protector device adapted for assembly onto a set of mounting plugs connected in circuit relation with a start winding and a run winding of a winding circuit for a dynamoelectric machine, said combination starter-protector device comprising a housing, at least a pair of terminals mounted to said housing, one of said terminals being adpated for connection to a power source, a thermally responsive current carrying switch means mounted within said housing for engagement with said terminals and adapted for actuation generally in response to a predetermined thermal condition occasioned upon winding circuit overload toward a position disengaged from said terminals, a solid state component for controlling energization of the start winding, a pair of means mounted in said housing for electrical contact and positioning engagement with said solid state component so as to dispose it generally adjacent said switching means and including means for releasably receiving one of the mounting plugs of the set thereof connected in the circuit relation with the start winding and the run winding, respectively, and means for electrically connecting the other of said terminals in circuit relation with one of said engagement means and extending at least in part exteriorly of said housing so that the electrical connection of said connecting means with said other terminal is exteriorly of said housing.

30. A combination starter-protector device as set forth in claim 29 wherein said one engagement means includes tab means for electrical connection with said connecting means.

31. A combination starter-protector device as set forth in claim 29 wherein at least said one engagement means includes means for abutment with said housing so as to dispose said solid state component adjacent said switch means in heat transfer relation terewith, said solid state component being operable generally in response to current flow therethrough to increase its resistance generally as a function of its temperature so as to render the start winding ineffective in the winding circuit when the dynamoelectric machine is energized to a predetermined speed, and the heat transmitted from said solid state component to said switching means being effective generally to delay its return toward making engagement with said terminals in the event of the occurrence of the predetermined thermal conditions.

32. A combination starter-protector device adapted for assembly onto a set of mounting plugs connected in circuit relation with a start winding and a run winding of a winding circuit for a dynamoelectric machine, said combination starter-protector device comprising a housing, thermal responsive current carrying switch means in said housing for protecting the winding circuit in the event of an overload condition thereof, means for controlling energization of the start winding, a pair of means mounted in said housing for electrical and positioning engagement with said energization controlling means and respectively including means for receiving one of the mounting plugs of the set thereof, and means for connecting said switch means in circuit relation with one of said electrical and positioning engagement means and for mounting said switch means in said housing generally adjacent said energization controlling 33. A combination starter-protector device as set forth in claim 32 further comprising a terminal in said housing adapted to be connected to a power source, said switch means being movable from a position in making engagement with said terminal toward a position disengaged from said terminal in the event of the occurrence of the overload condition.

34. A commbination starter-protector device as set forth in claim 32 wherein said connecting and mounting means comprises a metallic bracket having a pair of spaced apart portions disposed in electrical contactingand mounting engagement with said one engagement means and said switch means, respectively.

35. A combination starter-protector device as set forth in claim 34 wherein said housing includes means for abutment with said bracket so as to maintain it generally against displacement movement in said housing.

36. A combination starter-protector device as set forth in claim 34 further comprising a terminal in said housing in circuit relation with said switch means and adapted to be connected with a power source, and means engaged with said bracket for adjustably urging said switch means toward circuit making engagement with said terminal.

37. A combination starter-protector device adapted for assembly onto a set of mounting plugs connected in circuit relation with a start winding and a run winding of a winding circuit for a dynamoelectric machine, said combination starter-protector device comprising a housing, at least a pair of terminals in said housing, one of said terminals being adapted for connection with a power source, switch means mounted in said housing for making engagement with said terminals and adapted for actuation generally in response to a certain thermal condition occasioned upon winding circuit overload toward a position disengaged from said terminals, means for controlling energization of the start winding and operable generally in response to current flow therethrough for increasing its resistance generally as a function of its temperature, a pair of means in said housing for electrical and positioning engagement with said energization controlling means so as to dispose it generally in heat transfer relation with said switch means and respectively including means for receiving one of the mounting plugs of the set thereof, and means in said housing for connecting the other of said terminals with one of said electrical and positioning engagement means.

38. A combination starter-protector device adapted for assembly onto a set of mounting plugs connected in circuit relation with a start winding and a run winding of a winding circuit for a dynamoelectric machine, the combination starter-protector device comprising a housing including a pair of generally opposing end walls, sidewall means interconnecting with said end walls and defining therewith a chamber in said housing, and a pair of openings in said housing extending through said sidewall means and connecting with said chamber, another circuit for controlling the passage of current to the winding circuit including thermal responsive current carrying switch means mounted in said chamber adjacent one of said end walls and movable from a current passing position in said another circuit toward a current interrupting position in response to a predetermined thermal condition occasioned upon winding circuit overload, a first current carrying member mounted in said chamber generally adjacent said switch means, a first electrical socket extending from said first member and disposed in one of said openings for receiving in electrical connection one of the mounting plugs of the set thereof connected in the circuit relation with the run winding, means for connecting said first member in said another circuit in series relation with said switch means thereby to pass the current from said switch means through said first member and said first socket to effect energization of the runwinding when said switch means is in its current passing position, a PTCR having a pair of opposite side portions, one of said opposite side portions of said PTCR being disposed in electrical engagement with said first member, a second current carrying member disposed between the other of said end walls and the other of the opposite side portions of said PTCR in electrical engagement therewith, a second electrical socket extending from said second member and disposed in the other of said openings for receiving in electrical connection another of the mounting plugs of the set thereof connected in the circuit relation with the start winding, said PTCR being operable generally to increase its resistance generally as a function of its temperature in response to current passing therethrough from said first member to said second member and said second socket to generally render the starting winding ineffective in the winding circuit at a selected speed of the dynamoelectric machine and said PTCR also being operable generally to transmit heat to said switching means so as to delay its return to the current passing position thereof when said switch means is in its current interrupting position, and means engaged between said other end wall and said second member for urging it toward its electrical engagement with said other opposite side portion of said PTCR and for urging said one opposite side portion thereof toward its electrical engagement with said first member.

39. A combination starter-protector device for a winding circuit having a run winding and a start winding of a dynamoelectric machine adapted to be energized across a power source, the combination starter-protector device comprising a housing having a chamber therein, a mounting component within said chamber and removably secured therein in abutment with said housing, a pair of terminals adapted for connection across the power source and mounted in said housing, a recess in said mounting component communicating with said chamber, means adapted for controlling the energization of the start winding, means disposed at least in part within said recess for electrical contact and positioning engagement with said energization controlling means comprising a pair of plates disposed in circuit relation generally across said energization controlling means, a plurality of terminal means mounted in said housing, two of said terminal means being connected with said plated and adapted to be connected in circuit relation with the run winding and the start winding, respectively, and a third one of said terminal means being connected in circuit relation with one of said terminals, and circuit means within said housing between the other of said terminals and one of said plates including means disposed at least in part within said recess and operable generally in response to a predetermined thermal condition occasioned upon winding circuit overload for interrupting said circuit means, and means disposed at least in part in said recess for electrical connection in series circuit relation between said interrupting means and said one plate and for supporting said one plate so as to dispose said energization controlling means generally adjacent said interrupting means.

40. A combination starter-protector device for a winding circuit of a dynamoelectric machine having a run winding and a start winding adapted to be energized from a power source, the combination starter-protector device comprising a housing; a terminal in said housing adapted to be connected to the power source; means in said housing for controlling energization of the start winding; a pair of means mounted in said housing for electrical contact and positioning engagement with said energization controlling means and adapted to be connected in circuit relation with the start winding and the run winding, respectively; and means for supplying power to the winding circuit including another terminal in said housing, a connection extending at last in part exteriorly of said housing and between said another terminal and one of said engagement means, and a bimetal switch engaged between said first named terminal and said another terminal and operable generally in response to a preselected thermal condition occasioned upon winding circuit overload toward a position disengaged from said first named terminal and said another terminal so as to interrupt the supply of power to the winding circuit.

41. A combination starter-protector device for a winding circuit of a dynamoelectric machine having a run winding and a start winding adapted to be energized from a power source, the combination starter-protector device comprising a housing having three terminals therein with one of said terminals adapted to be connected to the power source; means in said housing for controlling energization of the start winding; a pair of means mounted in said housing for electrical contact and positioning engagement with said energization controlling means and adapted to be connected in circuit relation with the start winding and the run winding, respectively; means for supplying power to the winding circuit including a connection between one of said other two terminals and one of said engagement means and extending at least in part exteriorly of said housing, a bimetal switch element in said housing engaged between said other two terminals, and means for heating said bimetal switch element electrically connected between said one terminal and the other of said other two terminals, said bimetal switch element being operable generally in response to a preselected thermal condition occasioned upon winding circuit overload toward a position disengaged from said other two terminals so as to interrupt the supply of power to the winding circuit.

42. A combination starter-protector device for a winding circuit of a dynamoelectric machine having a run winding and a start winding adapted to be energized from a power source, the combination starter-protector device comprising a housing; at least one terminal in said housing adapted to be connected to the power source; means in said housing for controlling energization of the start winding; a pair of means mounted in said housing for electrical contact and positioning engagement with said energization controlling means and adapted to be connected in circuit relation with the start winding and the run winding, respectively; and means for supplying power to the winding circuit comprising another circuit between one of said engagement means and said at least one terminal, said another circuit including means in said housing and operable generally in response to a preselected thermal condition occasioned upon winding circuit overload for interrupting said another circuit, and means for mounting said interrupting means in said housing and for electrically connecting it in circuit relation with said one engagement means.

43. A combination starter-protector device for a winding circuit of a dynamoelectric machine having a run winding and a start winding adapted to be energized from a power source, the combination starter-protector device comprising a housing; at least one terminal in said housing adapted to be connected to the power source; means in said housing for controlling energization of the start winding; a pair of means mounted in said housing for electrical contacting and positioning engagement with said energization controlling means and including plug receiving means disposed generally within said housing for effecting connection of said engagement means in circuit relation with the start winding and the run winding, respectively; and means for supplying power to the winding circuit comprising another circuit between one of said engagement means and said at least one terminal, said another circuit including means in said housing and operable generally in response to a preselected thermal condition occasioned upon winding circuit overload for interrupting said another circuit.

* * * * *

UNITED STATES PATENT AND TRADEMARK OFFICE
CERTIFICATE OF CORRECTION

PATENT NO. : 4,042,860

DATED : August 16, 1977

INVENTOR(S) : Lee O. Woods & James P. Frank

It is certified that error appears in the above-identified patent and that said Letters Patent are hereby corrected as shown below:

Col. 1, line 46, delete "hermatic" and insert --hermetic--.
Col. 3, line 8, after "component" insert "," (comma);
line 14, delete "or" and insert --are--.
Col. 4, line 59, delete "gripping" and insert --grippingly--;
line 60, delete "releasable" and insert --releasably--.
Col. 5, line 45, delete "thereto" and insert --therefor--.
Col. 7, line 65, delete "of" (first occurrence) and insert --or--.
Col. 8, line 67, delete "," (comma);
line 68, after "pling" insert --,-- (comma).
Col. 10, line 42, after "as" insert --a--;
line 58, after "23" insert --,-- (comma).
Col. 11, line 41, after "187" insert --exteriorly of housing 163,--.
Col. 13, line 65, after "105" insert --,-- (comma).
Col. 14, line 9, delete "surface" and insert --surfaces--;
line 37, delete "thrugh" and insert --through--.
Col. 16, line 32, delete "leas" and insert --lead--.
Col. 18, line 4, delete "responseto" and insert --response to--;
line 22, delete "further" and insert --means--; same line, delete "means" and insert --further--.
Col. 20, line 11, delete "terewith" and insert --therewith--;
line 38, after "controlling" insert --means.--;
line 46, delete "commbination" and insert --combination--;
line 50, delete "gand" and insert --g and--.
Col. 21, line 46, delete "runwinding" and insert --run winding--.

UNITED STATES PATENT AND TRADEMARK OFFICE

CERTIFICATE OF CORRECTION

PATENT NO. : 4,042,860

DATED : August 16, 1977

INVENTOR(S) : Lee O. Woods & James P. Frank

It is certified that error appears in the above-identified patent and that said Letters Patent are hereby corrected as shown below:

Col. 22, line 25, delete "plated" and insert --plates--.

Signed and Sealed this

*Sixteenth* Day of *May 1978*

[SEAL]

*Attest:*

RUTH C. MASON
*Attesting Officer*

LUTRELLE F. PARKER
*Acting Commissioner of Patents and Trademarks*